United States Patent
Pham et al.

(10) Patent No.: US 11,409,863 B2
(45) Date of Patent: *Aug. 9, 2022

(54) COMPUTER-BASED SYSTEMS CONFIGURED FOR DETECTING AND SANDBOXING EXTERNAL RESOURCES AND METHODS OF USE THEREOF

(71) Applicant: Capital One Services, LLC, McLean, VA (US)

(72) Inventors: Vincent Pham, Champaign, IL (US); Joseph Boayue, McLean, VA (US); Lee Adcock, McLean, VA (US); Geeta Shyamala, McLean, VA (US); Ana Cruz, McLean, VA (US); Christopher Camenares, McLean, VA (US); Nahid Farhady Ghalaty, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 29 days.

This patent is subject to a terminal disclaimer.

(21) Appl. No.: 16/904,065

(22) Filed: Jun. 17, 2020

(65) Prior Publication Data
US 2021/0097170 A1    Apr. 1, 2021

Related U.S. Application Data

(63) Continuation of application No. 16/589,822, filed on Oct. 1, 2019, now Pat. No. 10,789,354.

(51) Int. Cl.
*G06F 21/53* (2013.01)
*G06F 21/56* (2013.01)
(Continued)

(52) U.S. Cl.
CPC .............. *G06F 21/53* (2013.01); *G06F 9/442* (2013.01); *G06F 21/561* (2013.01);
(Continued)

(58) Field of Classification Search
CPC ...... G06F 21/53; G06F 21/561; G06F 21/566; G06F 21/577; G06F 21/62;
(Continued)

(56) References Cited

U.S. PATENT DOCUMENTS 10,789,354 B1* 9/2020 Pham .................... G06F 21/561
2010/0250579 A1 9/2010 Levow
(Continued)

*Primary Examiner* — Ashokkumar B Patel
*Assistant Examiner* — William B Jones
(74) *Attorney, Agent, or Firm* — Greenberg Traurig, LLP

(57) ABSTRACT

To facilitate improved email and device security, embodiments of systems and methods include intercepting, by a processor associated with an entity, an internet request, where the internet request is produced by a link received in an email at a first computing device. The processor determines that the link is externally bound relative to an entity network. The processor determines an existence of a sandbox environment instance in a set of existing sandbox environment instances. The processor routes the link through the sandbox environment instance. The processor updates the sandbox log in the database based on the sandbox environment instance and the link. The processor causes to display on a screen of the first computing device a user interface for interacting with the link in the sandbox environment instance, and the processor logs activities associated with interacting with the link in a security log.

11 Claims, 8 Drawing Sheets

(51) Int. Cl.
*G06F 9/4401* (2018.01)
*G06F 21/57* (2013.01)

(52) U.S. Cl.
CPC .......... *G06F 21/564* (2013.01); *G06F 21/566* (2013.01); *G06F 21/577* (2013.01)

(58) Field of Classification Search
CPC ... G06F 21/6218; G06F 21/51; H04L 9/0861; H04L 9/3231; H04L 9/3239
See application file for complete search history.

(56) References Cited

U.S. PATENT DOCUMENTS

| | | | |
|---|---|---|---|
| 2014/0006347 A1* | 1/2014 | Qureshi | G06F 21/6209 707/783 |
| 2017/0169215 A1* | 6/2017 | Vejmelka | G06F 21/564 |
| 2018/0139178 A1* | 5/2018 | Gan | G06F 21/552 |
| 2019/0034633 A1* | 1/2019 | Seetharamaiah | G06F 9/45558 |

* cited by examiner

COMPUTER-BASED SYSTEMS CONFIGURED FOR DETECTING AND SANDBOXING EXTERNAL RESOURCES AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC, All Rights Reserved.

FIELD OF TECHNOLOGY

The present disclosure generally relates to improved computer-based platforms/systems, improved computing devices/components and/or improved computing objects configured for one or more novel technological applications of detecting and sandboxing external resources and methods of use thereof.

BACKGROUND OF TECHNOLOGY

A computer network platform/system may include a group of computers (e.g., clients, servers, smart routers and other computing hardware devices) that are linked together through one or more communication channels to facilitate communication and/or resource-sharing, via one or more specifically programmed graphical user interfaces (GUIs) of the present disclosure, among a wide range of users.

SUMMARY OF DESCRIBED SUBJECT MATTER

In some embodiments, the present disclosure provides an exemplary technically improved computer-based method that includes at least the following steps of intercepting, by a processor associated with an entity, an internet request, where the internet request is produced by a link received in an email at a first computing device. The processor determines that the link is externally bound relative to an entity network. The processor determines an existence of a sandbox environment instance in a set of existing sandbox environment instances where the sandbox environment instance is associated with the link according to a sandbox log, where the sandbox log is stored on a database associated with the entity, where the sandbox environment instance includes an environment for executing software with restricted access to at least one resource associated with the entity, where the sandbox environment instance is hosted at a second computing device associated with the entity, where the processor is remote from the first computing device, where each of the existing sandbox environment instances are associated with one or more additional computing devices, and where each of the existing sandbox environment instances route a common link associated with the one or more additional computing devices. The processor routes the link through the sandbox environment instance. The processor updates the sandbox log in the database based on the sandbox environment instance and the link. The processor causes to display on a screen of the first computing device a user interface for interacting with the link in the sandbox environment instance, and the processor logs at least one activity associated with interacting with the link in a security log, where the security log is stored in the database associated with the entity.

In some embodiments, the present disclosure provides an exemplary technically improved computer-based method that includes at least the following steps of receiving, by a processor of a user device associated with an entity network, a link in an email at a first computing device. The processor determines that the link is externally bound relative to the entity network. The processor requests a sandbox environment instance associated with the link at an entity relative to the user device, where the sandbox environment instance includes an environment for executing software with restricted access to at least one resource associated with the entity, where the request causes the entity to; determine an existence of the sandbox environment instance in a set of existing sandbox environment instances, where the sandbox environment instance is associated with the link according to a sandbox log, where the sandbox log is stored on a database associated with the entity, where the existing sandbox environment instances are associated with one or more additional computing devices, where each of the existing sandbox environment instances route a common link associated with the one or more additional computing devices, to route the link through the sandbox environment instance, to update the sandbox log in a database associated with the entity based on the sandbox environment instance and the link, to communicate a user interface for interacting with the link to the user device, and to log at least one activity associated with interacting with the link in a security log, where the security log is stored in the database associated with the entity. The processor causes to display on a screen of the first computing device the user interface for interacting with the link in the sandbox environment instance.

In some embodiments, the present disclosure provides an exemplary technically improved computer-based system that includes at least the following components of a database associated with an entity, configured to store a sandbox log for recording at least one sandbox environment instance and associated links, and store a security log for logging at least one activity associated with interacting with the associated links. A processor is configured to: intercept an internet request, where the internet request is produced by a link received in an email associated with a first computing device, determine that the link is externally bound relative to an entity network, determine an existence of a sandbox environment instance of the at least one sandbox environment instance associated with the link according to the sandbox log, where the sandbox environment instance includes an environment for executing software with restricted access to resources, where the sandbox environment instance is hosted with the processor associated with the entity, where the processor is remote from the first computing device. The processor is further configured to determine that an existing sandbox environment instance routes the link for at least one additional computing device, select the existing sandbox environment instance as the sandbox environment instance, route the link through the sandbox environment instance, update the sandbox log in the database based on the sandbox environment instance and the link, cause to display on a screen of the first computing device a user interface for interacting with the link in the sandbox environment instance, and log at least one activity associated with interacting with the link in a security log.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
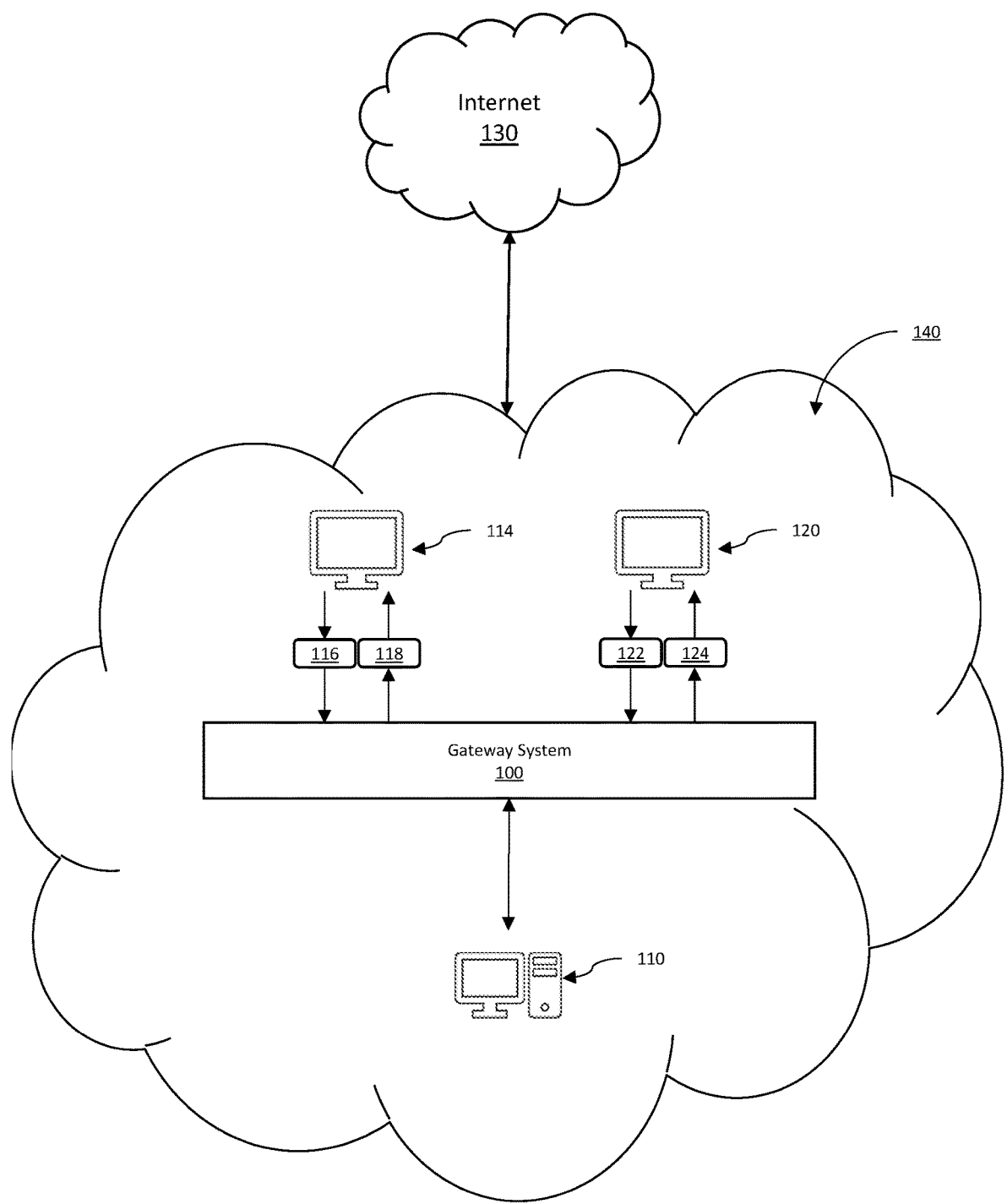
FIGS. 1-8 show one or more schematic flow diagrams, certain computer-based architectures, and/or screenshots of various specialized graphical user interfaces which are illustrative of some exemplary aspects of at least some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems of the present disclosure may be implemented across one or more of various computer platforms such as, but not limited to: (1) AmigaOS, AmigaOS 4, (2) FreeBSD, NetBSD, OpenBSD, (3) Linux, (4) Microsoft Windows, (5) OpenVMS, (6) OS X (Mac OS), (7) OS/2, (8) Solaris, (9) Tru64 UNIX, (10) VM, (11) Android, (12) Bada, (13) BlackBerry OS, (14) Firefox OS, (15) iOS, (16) Embedded Linux, (17) Palm OS, (18) Symbian, (19) Tizen, (20) WebOS, (21) Windows Mobile, (22) Windows Phone, (23) Adobe AIR, (24) Adobe Flash, (25) Adobe Shockwave, (26) Binary Runtime Environment for Wireless (BREW), (27) Cocoa (API), (28) Cocoa Touch, (29) Java Platforms, (30) JavaFX, (31) JavaFX Mobile, (32) Microsoft XNA, (33) Mono, (34) Mozilla Prism, XUL and XULRunner, (35) .NET Framework, (36) Silverlight, (37) Open Web Platform, (38) Oracle Database, (39) Qt, (40) SAP NetWeaver, (41) Smartface, (42) Vexi, and (43) Windows Runtime.

In some embodiments, exemplary inventive computer-based systems of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

FIGS. 1 through 8 illustrate systems and methods of external resource detection and sandboxing. The following embodiments provide technical solutions and/or technical improvements that overcome technical problems, drawbacks and/or deficiencies in the technical fields involving device security, network security, network communication, remote processing, and external threat detection. As explained in more detail, below, technical solutions and/or technical improvements herein include aspects of improved threat quarantining, virtual machine management, threat detection, threat monitoring, internet communication, among others. Based on such technical features, further technical benefits become available to users and operators of these systems and methods. Moreover, various practical applications of the disclosed technology are also described, which provide further practical benefits to users and operators that are also new and useful improvements in the art.

FIG. 1 depicts a diagram of an exemplary illustrative external resource sandboxing system in accordance with an illustrative embodiment of the present invention.

In some embodiments, an exemplary external resource sandboxing system may include a gateway system 100. The gateway system 100 may interact with each computing device within a local network 140, such as, e.g., an intranet or local area network (LAN), or other suitable local networking system. In some embodiments, the gateway system 100 provides security functionality to computing devices within the local network 140 by, e.g., preventing external resources, such as, e.g., external web-pages, files from an external source, images or other media from an external source, among other external resources, from interacting with computing devices within the local network 140 without first being validated as safe.

As used herein, the term "sandbox" identifies at least one software component and/or a combination of at least one software component and at least one hardware component which are designed/programmed/configured to manage/control untested and untrusted programs or code from, e.g., unverified, untrusted third parties, suppliers, users and/or websites, without risking harm to a host machine, such as a computing device, mobile computing device, server, cloud platform, or other devices and/or systems. As used herein, the term "sandbox" may include virtualization techniques to separate a program and or code from the host system to mitigate system failures and/or software vulnerabilities to prevent the program and/or code from harming the host system and/or device.

In some embodiments, the local network 140 includes a first user computing device 114 and one or more additional user computing devices 120. In some embodiments, users at the user computing devices 114-120 may interact with external resources on, e.g., the Internet 130. For example, in some embodiments, the user computing device 114 may engage with the Internet 130 via, e.g., sending and/or receiving emails to external addresses, including external Internet Protocol (IP) addresses and/or external Simple Mail Transfer Protocol (SMTP) addresses, Post Office Protocol (POP) addresses, Internet Message Access Protocol addresses, among other addresses and locations external to the local network 140. However, to prevent malicious communication content form the internet 130 to the user computing device 114, the gateway system 100 may monitor the communications to quarantine any suspicious resources or other communications received from the external entities through the internet 130.

In some embodiments, the user computing device 114 may attempt a communication with an external source, such as the internet 130 or other entity, host, network or source, using requests 116 that return 118 data and/or resources from the external source. Similarly, each other computing device 120 on the local network 140 may send requests 122 and receive returns 124 with external sources, including with the internet 130. However, in some embodiments, the gateway system 100 may be located between the user computing devices 114-120 and, e.g., the internet 130 by intercepting both the requests 116-122 and the returns 118-124. Thus, in some embodiments, the gateway system 100 may monitor traffic and communication between the user computing devices 114-120 and the internet 130, including any external entities and/or hosts. While monitoring, the gateway system 100 may check resources and data passing between entities and/or hosts on the internet 130 and the user computing devices 114-120. Such checks may include comparing the data and resources against lists of known threats, known malicious software, known viruses, among other known risks. Additionally, the checks may include an analysis of characteristics and attributes of the data and resources, such as, e.g., origin, metadata, destination, data type, among other attributes.

In some embodiments, the local network and the gateway system 100 may include any desired number of user computing devices 114-120. In some embodiments, resources for networking may be limited. Thus, in some embodiments, the number of user computing devices 114-120 may include, e.g., between about 2 and about 15, between about 2 and about 25, between about 2 and about 100, between about 2 and about 1000, etc.

In some embodiments, based on the known risks and/or the attributes, the gateway system 100 may determine a risk level of the data and/or resource. For example, the gateway system 100 may determine a classification as malicious or not malicious. In some embodiments, the gateway system 100 may additionally or alternatively determine a risk level, e.g., high, medium or low, or on a numeric scale of between about 1 and about 10, or between about 1 and about 100.

In some embodiments, the gateway system 100 may determine a risk level according to a comparison of the data and/or resource with past intercepted data and/or resources. Based on an outcome of the past data and/or resources and a degree of similarity according to, e.g., attributes of both the data and/or resource and the attributes of the past data and/or resources, the gateway system 100 may determine probability of risk. For example, the gateway system 100 may include, e.g., a machine learning model such as, e.g., a neural network, a prediction model (e.g., k-nearest neighbor, random forests, decision trees, regression, among others), or other machine learning technique to predict a risk level for a given data and/or resource according to, e.g., attributes of the data and/or resource.

Based on the risk of the data and/or resource, the gateway system 100 may quarantine the data and/or resource to insulate the user computing devices 114-120 from potentially malicious activity. For example, the gateway server 100 may prevent the external data and/or resource from reaching a user computing device 114-120 by, e.g., deleting the data and/or resource. However, in other embodiments, the gateway system 100 may load the data and/or resource in a remote environment, such as a sandbox or virtual machine, remote from the associated user computing device 114-120. As a result, the gateway system 100 may allow the data and/or resource to be loaded in a secure and isolated environment. Outputs from the data and/or resource may then be passed to the user computing device 114-120 associated with the data and/or resource by masquerading as the return 118-124. Thus, the user computing device 114-120 may view the results of the data and/or resource without locally interacting with the data and/or resource. As such, the user computing devices 114-120 are each insulated from any malicious code or data present in the data and/or resource.

In some embodiments, an administrator, via an administrative computing device 110 may interact with the gateway system 100 to, e.g., establish security policies, view traffic and routing logs, view security information, view data and resources flagged as risky, set riskiness limits, whitelist and/or blacklist websites and other external hosts, among other administrative functions. Accordingly, in some embodiments, the administrative computing device 110 may analyze received data and/or resources, including, e.g., metadata, attributes, source, destination, contents (e.g., source code, hypertext markup language (HTML) code, extensible markup language (XML) code, or other contents) among other features of the data and/or resource. Based on a comparison of the attributes, source, destination, contents, and other features, with any effects on, e.g., a sandbox environment, virtual machine, or remote server or computing device, the administrative computing device 110 may diagnose the malicious features of the data and/or resource. For example, the comparison may find that the data and/or resource originates from a host that has previously sent malicious data and/or resources. Similarly, the comparison may find that a data structure or HTML snippet has deleterious effects on computing systems. In other embodiments, the data and/or resource may, itself, not be malicious, but may include code and/or data that causes an error, such as, e.g., incompatible code, infinite loops, or other errors. Other effects and risk may be diagnosed from the data and/or resource by the administrative computing device 110. In some embodiments, the administrative computing device 110 may then be used to further define risk determinations, such as, e.g., by providing the data and/or resource with the deleterious effect, as well as the deleterious effect itself, to the machine learning model for risk assessment of the gateway system 100 as a training pair to train the machine learning model. In other embodiments, the administrative computing device 110 may be used to define, e.g., external hosts, networks, entities, and other resources as malicious or risky, as well as other modifications to security policies in response to the diagnosis.

In some embodiments, the gateway system 100 may include one administrative computing device 110. In some embodiments, the gateway system 100 may include any number of administrative computing device 110 such that administrators may effectively access the gateway system 100 to administer the local network and user computing devices 114-120 included therein. For example, in some embodiments, the gateway system 100 may include, e.g., between about 1 and about 5 administrative computing devices 110, between about 1 and about 10 administrative computing devices 110, between about 1 and about 20 administrative computing devices 110, etc.

Figure 2:
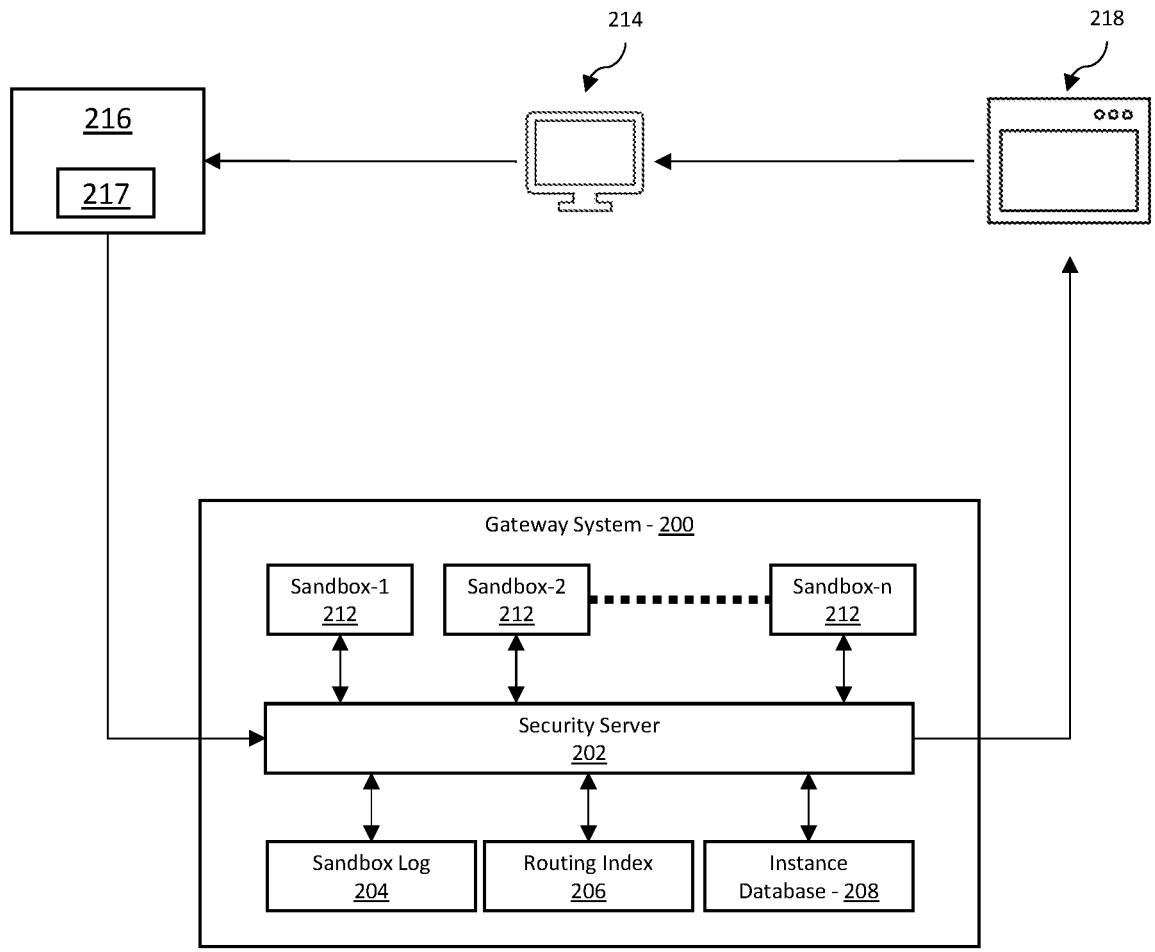

FIG. 2 depicts a diagram of a gateway system of an exemplary illustrative external resource sandboxing system in accordance with another illustrative embodiment of the present invention.

In some embodiments, a gateway system 200, such as, e.g., the gateway system 100 described in reference to FIG. 1 above, may receive a request 216 from a user computing device 214 bound for another device, entity, host, or other address from the user computing device 214. For example, in some embodiments, the request includes a webpage request resulting from clicking a uniform resource locator (URL) link. In some embodiments, the URL link is received by the user computing device 214 in an email and the gateway system 200 detects the selected URL link and resulting web request by monitoring traffic to and from the email application at the user computing device 214. Thus, the user computing device 214 may incorporate an integration in the email application with the gateway system 200. The security server 202 may be configured to intercept the request 216 regardless of the source of the email with the URL link. In other embodiments, the security server 202 may configured to intercept the request 216 where the security server 202 detects that the email originates from outside of the local network, e.g., from outside of a company associated with the local network. However, in some embodiments, the gateway system 200 monitors every request 216 from the user computer device 214, and each other user computing device on a network gated by the gateway system 200.

In some embodiments, the gateway system 200 intercepts the request 216 using a security server 202 having, e.g., one or more processors, storage devices, memory devices, among other suitable hardware for enacting security policies while monitoring network traffic, including the request 216. In some embodiments, the security server 216 analyzes the request 216, including determining an address 217 for which the request is bound 216. In some embodiments, depending on whether the address 217 is internally bound, e.g., bound for a host internal to the local network, or externally bound, the security server 202 may determine to quarantine the data called by the request 216, e.g., the HTML code of a webpage associated with the URL link. In some embodiments, the policies enacted by the security server 202 may assume that data originating within the local network, e.g., of the company, is safe. As a result, the security server 202 may route internally bound requests 216 to respective destinations, and allow a reply 218 to be provided directly back to the associated user computing device 214.

In some embodiments, the security server 202 may instantiate any number of sandboxes sufficient to quarantine each selected link, or to quarantine each unique selected link. However, in some embodiments, resources for sandboxes may be limited. Thus, in some embodiments, the number of sandboxes may include, e.g., between about 2 and about 15, between about 2 and about 25, between about 2 and about 100, etc.

However, in some embodiments, the security server 202 may not allow the return 218 of externally bound requests 216 to be routed directly to the user computing device 214. Rather, to prevent the risk of any malicious, error-inducing, or otherwise detrimental data to be introduced into the system of the user computing device 214, the security server 202 may quarantine the return 218 for processing in a secured environment. In some embodiments, the secured environment may include one of any number of sandboxes 212 instantiated and controlled by the security server 202.

In some embodiments, to facilitate determining whether a requested link is inbound or outbound, the security server 202 may consult a routing index 206. In some embodiments, the routing index 206 may include an index, stored in a storage device and/or database, of addresses and routes local to the local network. The security server 202 may compare the destination address 217 with the addresses indexed in the routing index 206 to determine whether the destination address 217 is included in the index. Where the destination address 217 is found in the routing index 206, the route is internally bound. However, where the destination address 217 is not found in the routing index 206, the route is externally bound, and thus corresponds to an address outside of the local network. In some embodiments, upon the comparison with the routing index 206, the security server 202 may classify the destination address 217 as externally bound, and thus classify the link associated with the request 216 as risky. As a result of the riskiness classification, the security server 202 may route the link associated with the request through a sandbox 212 such that information sent by the link is received by the sandbox 212, and not directly by the user computing device 214.

In some embodiments, in addition, or alternatively to the riskiness classification based on whether the address 217 is internally or externally bound, the security server 202 may determine a risk level according to attributes and characteristics of the associated link, the requests 216, the address 217 and even the email in which the link was sent. The attributes and characteristics can include, e.g., origin, metadata, destination, data type, source code, HTML code, XML code, contents of the email in which the link was delivered, among other attributes.

The security server 202 may compare the attributes and characteristics to known threats, known malicious software, known viruses, among other known risks recorded in, e.g., sandbox logs 204 that log behaviors of data and programs in the sandboxes 212. Based on the comparison and the analysis of the characteristics and attributes of the link, in some embodiments, the security server 202 may determine a risk level of the data and/or resource. For example, the security server 202 may determine a risk level, e.g., high, medium or low, or on a numeric scale of between about 1 and about 10, or between about 1 and about 100.

In some embodiments, the security server 202 may determine a risk level according to a comparison of the data and/or resource with past intercepted data and/or resources. Based on an outcome of the past data and/or resources and a degree of similarity according to, e.g., attributes of both the data and/or resource and the attributes of the past data and/or resources, the security server 202 may determine probability of risk. For example, the security server 202 may include, e.g., a machine learning model such as, e.g., a neural network, a prediction model (e.g., k-nearest neighbor, random forests, decision trees, regression, among others), or other machine learning technique to predict a risk level for a given data and/or resource according to, e.g., attributes of the data and/or resource.

In some embodiments, to improve efficiency and security tracking, common links requests by more than one user computing device can be sandboxed together in a common sandbox 212. For example, by routing returns 218 from requests 216 to common addresses 217 from multiple user computing devices through a common sandbox 212, fewer sandboxes need to be scheduled and instantiated. As a result, hardware resource demands are reduced. Moreover, the common sandbox 212 can log data associated with behaviors of the returns 218 in, e.g., a sandbox log 204. Because multiple returns 218 are being associated with one address 217, more data regarding the address 217 is accumulated in a sandbox log 204 associated with the sandbox 212 than if the returns 218 were routed through separate sandboxes 212. Accordingly, upon inspection of the sandbox log 204 by, e.g., an administrator at an administrative computing device, such as the administrative computing device 110 described above, malicious data and/or code as well as data and/or code that conflicts with sandbox environment can be more easily diagnosed.

In some embodiments, to determine whether a sandbox 212 exists for a particular destination address 217, the security server 202 may access a list of sandbox instances stored in an instance database 208. In some embodiments, the security server 202 may track, in real-time, the instantiation and termination of sandboxes 212 in the instance database 208, including an associated address with each instantiated sandbox 212. Thus, an up-to-date log of running sandboxes 212 is accessible in the instance database 208. When a new request 216 is received, the security server 202 may compared the destination address 217 with an address associated with each sandbox as listed in the instance database 208. Where a sandbox 212 is found that is associated with the destination address 217, the security server 202 may add the request 216 to the existing sandbox 212 for receiving and executing any data and any code of a resulting response 218. However, where the security server 202 does not find an existing sandbox for the address 217, the security server 202 can instantiate a new sandbox 212 for receiving and executing any data and any code of a resulting response 218. In each case, the security server 202 may update the instance database 208 with the relationship between the address 217 and the sandbox 212.

In some embodiments, the security server 202 may instantiate each sandbox 212 according to security policies to prevent any harmful links from interacting with hardware and/or software outside of the sandbox environment. Thus, in some embodiments, each sandbox 212 may include a virtual sandbox instantiated using a virtual machine in a server environment. For example, the sandboxes 212 may be instantiated in respective virtual machines on a server different from the security server 202. Alternatively, the sandboxes 212 may be instantiated in respective virtual machines on the security server 202 itself.

In some embodiments, the security server 202 routes a link through a respective virtual sandbox 212 in response to the request 216. The sandbox 212 may then receive returns from the link, such as, e.g., metadata, webpages, images, files, video, text, Javascript™ code, among other data returned by the link. The sandbox 212 may then run any code and store and manipulate any files and media. In some embodiments, a return 218 is created by the sandbox 212 that represents interactions with the link. As such, in some embodiments, the sandbox 212 may be controlled by the user computer device 214 to interact with link in a selected way, such as, e.g., navigating the webpage, playing media, opening images, downloading files, running Javascript™, etc. Each of the interactions is performed within the sandbox 212, but the output can be displayed on a screen of the user computing device 214 as the return 218 in, e.g., a browser user interface (UI). Thus, code and data associated with the link are remote from the user computing device 214, but the user computing device 214 may nevertheless interact, indirectly, with the link.

In some embodiments, the security server 202 may record aspects of the interactions and resulting behaviors in the sandbox log 204. For example, in some embodiments, the security server 202 may log metadata associated with the link as well as statistics related to the link, such as, an amount of time spent navigating the link by a particular user, a number and identities of users interacting with a particular link, a pattern of side usage, bytes out, bytes in, Javascript™ behaviors, among other statistics related to interacting with the link. However, to prevent resource hogging and inefficiencies, the sandbox 212 may be configured to only remain for a period of time, such as a predetermined period of time selected by an administrator or as part of the security policies implemented by the security server 202. In some embodiments, the predetermined time may expire within a time-period after interactions with the link cease. The predetermined time may be a relative long time, such as, e.g., a day or a week, or it may be a relatively short time, such as, e.g., about 5 minutes, about 10 minutes, about half an hour, about an hour, or any other suitable time. A long time may facilitate discovery of a slow-acting virus. However, a short time may facilitate efficient resource use.

Based on the logged information, the security server 202 may further assess the risk level of the link using, e.g., a machine learning model such as the machine learning models described above. Based on past links and associated known risks, the machine learning model may be trained to identify risky or malicious links based on the characteristics, attributes, and link statistics described above. In response, in some embodiments, an administrator may whitelist or blacklist a link based on riskiness, as well as any observed effects on the sandbox environment. Additionally, antivirus plugins may also be incorporated and executed by the security server 202 to determine the maliciousness or riskiness of a link.

Thus, in some embodiments of the exemplary inventive gateway system for external resource sandboxing, the security server 202 implements sandboxes 212 to reroute links selected by users at user computing devices 214 into secured environments of the sandboxes 212. The security server 202 may then monitor and track the behaviors of the links within the sandboxes 212 while allowing the user computing devices 214 to engage with the link via a browser UI displaying a representation of link behaviors within the sandboxes 212. Accordingly, the user computing devices 214 may be kept safe and secure from malicious links while also centralizing link monitoring in the gateway system 200 for better tracking, logging and diagnosing of malicious and detrimental behaviors of links by the security server 202.

In some embodiments, to further prevent any harm or malicious activity, a user at the user computing device 214 may not search outside of the address 217 itself. Alternatively, the user may be confined to within a predetermined number of hops from the address 217.

Figure 3:
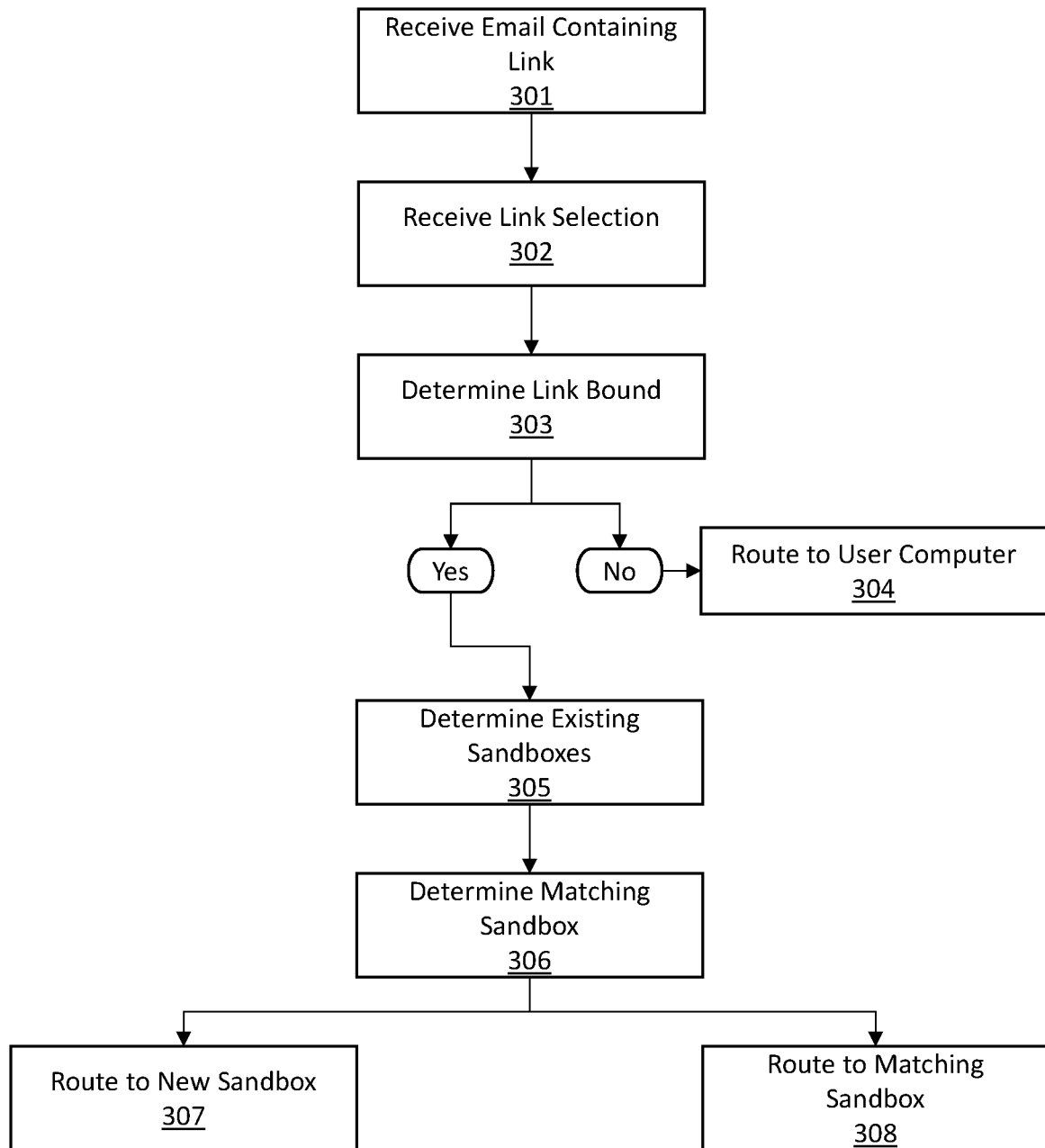

FIG. 3 depicts a block diagram of an exemplary illustrative methodology for external resource sandboxing in accordance with another illustrative embodiment of the present invention.

In some embodiments, the exemplary inventive external resource sandboxing platform may facilitate security of on-network computing devices by quarantining and/or sequestering dangerous web links selected in a user's received email messages. In some embodiments, the quarantining and/or sequestering includes routing the link through a secured and isolated sandbox environment implemented in virtual machine remote from the on-network computing devices. In some embodiments, such an external resource sandboxing platform secures against dangerous links according to an exemplary methodology as described below.

In some embodiments, the exemplary inventive external resource sandboxing platform may facilitate security of on-network computing devices by quarantining and/or sequestering dangerous web links selected in a user's received email messages. In some embodiments, the quarantining and/or sequestering includes routing the link through a secured and isolated sandbox environment implemented in virtual machine remote from the on-network computing devices. In some embodiments, such an external resource sandboxing platform secures against dangerous links according to an exemplary methodology as described below.

In some embodiments, a user device receives an electronic message, such as an email, instant message, text message, or other electronic message at block 301. In some embodiments, the electronic message includes, either within its message body, or within metadata or other components of the electronic message, a selectable link, including, e.g., a hyperlink, a URL link, internet protocol (IP) address link, or other selectable link to a network address.

In some embodiments, the user may select the link by, e.g., clicking on a hyperlink using, e.g., a mouse cursor or touch input, or by any other selection mechanism at block 302. The selection may initiate a request to the address associated with the link to return, e.g., code and data associated with the webpage for display in, e.g., a browser window. However, in some embodiments, the link selection may initiate a download of data, such as a file or media, or any other interaction with the host at the address associated with the link.

In some embodiments, a security system, such as a gateway or firewall, or other security server or security device, may intercept the request to the selected link to determine, at block 303, whether the link internally bound or externally bound relative to a local network in which the user device is located. The security system may examine the address associated with the link, such as an IP address. Using, e.g., a log of addresses internal to the local network, the security system may then determine if the address of the link is outside the local network, and thus externally bound.

In some embodiments, the security system may determine that, at block 304, that, no, the link is not externally bound. As a result, the direct routing of the link to the user device at which it was selected is initiated at block 304. Thus, the user device may interact with the link directly where the link has an address internal to the local network.

In some embodiments, the link may be determined that, yes, the link is externally bound, and thus a risk or dangerous. As a result of the link being externally bound, the security system may reroute the link to a secure sandbox, such as a virtual sandbox, by determining, at block 305, an existing set of sandboxes. In some embodiments, the security system may include a log of sandbox instances that records currently instantiated sandboxes as well as associated link information, such as a link addresses. Thus, sandboxes are maintained for each link selected by a user device on the local network and satisfying the risk threshold.

In some embodiments, the link and address of the link are compared to each sandbox instance in the log and the associated link information to determine, at block 306, whether a matching instance exists for the link address. In some embodiments, the matching may include comparing the address of the selected link to the address of a link associated with each instantiated sandbox.

In some embodiments, where an instantiated sandbox is not found that is associated with a matching address and/or link, a new sandbox may be instantiated at block 307. The new sandbox can be added to the log with the selected link and associated address. The selected link may then be routed through the new sandbox such that the new sandbox received data and/or code from the address to execute the link. For example, the new sandbox may open the webpage and run, e.g., Javascript™, Flash code, HTML, and any media and/or files present on the webpage. Thus, any malicious or harmful elements of the webpage affect only the new sandbox, which is isolated from physical systems on the local network by security policies. For example, the security policies may include restrictions on the ability of a user to navigate outside of the link address, restrictions on what hardware the webpage may access, restrictions on how long the webpage may run and how much data the webpage may transfer to the new sandbox, among other restrictions. However, to facilitate user interaction, a browser UI may be created at the user device to visually convey the link outputs, such as the webpage and any media, to a screen of the user device. Thus, the user may still interact with the webpage even though the webpage is being run remotely in the new sandbox.

In some embodiments, where an instantiated sandbox is found that is associated with a matching address and/or link, the link may be routed through the existing sandbox at block 308. The selected link and associated address can be added to the log with the existing sandbox. By routing the link through the existing sandbox, the existing sandbox receives data and/or code from the address to execute the link. For example, the new sandbox may open the webpage and run, e.g., Javascript™, Flash code, HTML, and any media and/or files present on the webpage. Thus, any malicious or harmful elements of the webpage affect only the existing sandbox, which is isolated from physical systems on the local network by security policies. For example, the security policies may include restrictions on the ability of a user to navigate outside of the link address, restrictions on what hardware the webpage may access, restrictions on how long the webpage may run and how much data the webpage may transfer to the existing sandbox, among other restrictions. However, to facilitate user interaction, a browser UI may be created at the user device to visually convey the link outputs, such as the webpage and any media, to a screen of the user device. Thus, the user may still interact with the webpage even though the webpage is being run remotely in the existing sandbox.

In some embodiments, the selected link may always be routed through a new sandbox specific to that selected link. However, by routing the link through a sandbox already associated with the link (e.g., the existing sandbox), multiple users may interact with a link in a common sandbox, which reduces resources. Moreover, routing the link through a common sandbox for multiple users may facilitate tracking link behaviors and collecting greater amounts of statistics and data associated with the link behaviors. Thus, in some embodiments, link analysis can be improved by using the existing sandbox, thus improving system and network security with greater knowledge of each link. The improved knowledge can be used to better identify dangerous and malicious links by, e.g., training machine learning models, such as those described above, whitelisting and blacklisting links by an administrator based on link behaviors, among other security improvements.

Figure 4:
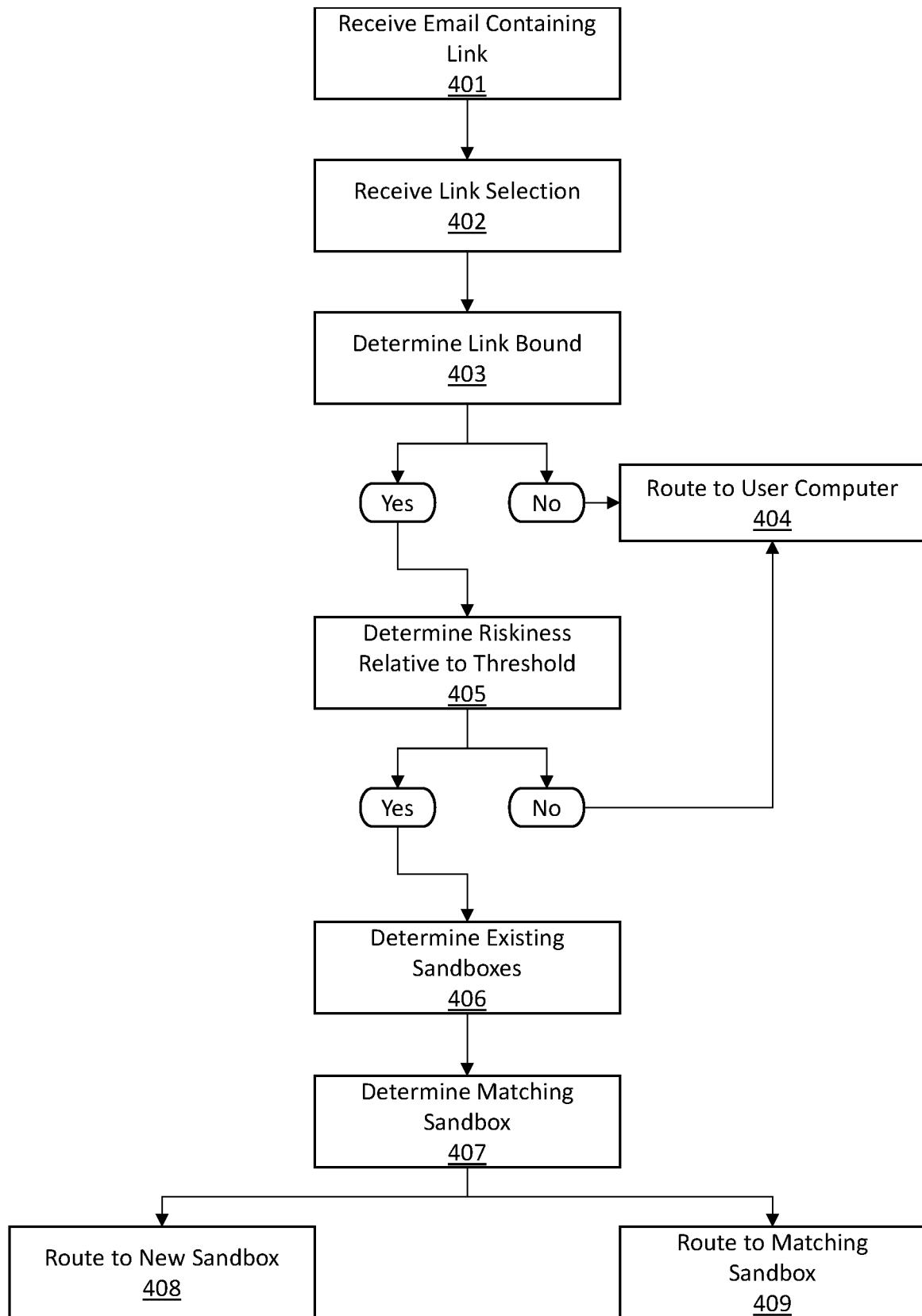

FIG. 4 depicts a block diagram of an exemplary illustrative methodology for external resource sandboxing in accordance with another illustrative embodiment of the present invention.

In some embodiments, the exemplary inventive external resource sandboxing platform may facilitate security of on-network computing devices by quarantining and/or sequestering dangerous web links selected in a user's received email messages. In some embodiments, the quarantining and/or sequestering includes routing the link through a secured and isolated sandbox environment implemented in virtual machine remote from the on-network computing devices. In some embodiments, such an external resource sandboxing platform secures against dangerous links according to an exemplary methodology as described below.

In some embodiments, a user device receives an electronic message, such as an email, instant message, text message, or other electronic message at block 401. In some embodiments, the electronic message includes, either within its message body, or within metadata or other components of the electronic message, a selectable link, including, e.g., a hyperlink, a URL link, internet protocol (IP) address link, or other selectable link to a network address.

In some embodiments, the user may select the link by, e.g., clicking on a hyperlink using, e.g., a mouse cursor or touch input, or by any other selection mechanism at block 402. The selection may initiate a request to the address associated with the link to return, e.g., code and data associated with the webpage for display in, e.g., a browser window. However, in some embodiments, the link selection may initiate a download of data, such as a file or media, or any other interaction with the host at the address associated with the link.

In some embodiments, a security system, such as a gateway or firewall, or other security server or security device, may intercept the request to the selected link to determine, at block 403, whether the link internally bound or externally bound relative to a local network in which the user device is located. The security system may examine the address associated with the link, such as an IP address. Using, e.g., a log of addresses internal to the local network, the security system may then determine if the address of the link is outside the local network, and thus externally bound. In some embodiments, sources of measuring risk may include external data sources of known compromised endpoints, whether the endpoint is unusual for outbound connections from the network, or dictionaries of domain categories where specific categories might be deemed riskier.

In some embodiments, the security system may determine that, at block 404, that, no, the link is not externally bound. As a result, the direct routing of the link to the user device at which it was selected is initiated at block 404. Thus, the user device may interact with the link directly where the link has an address internal to the local network.

In some embodiments, a riskiness of the link is determined at block 405. In some embodiments, each externally bound link is compared against a risk threshold that determines whether a link is classified as risky or not risky. Risk may be measured based on an analysis of characteristics and attributes of the link, such as, e.g., a scoring for types of metadata, quantity of Javascript™ or other executable code, size of the webpage in total data, reports from previous users that have visited the respective link, among other measures. Additionally, or alternatively, the measure of risk may be predicted using, e.g., machine learning models to correlate, e.g., metadata, HTML, Javascript™, Flash™ code, media, files, address, or other attributes and combinations thereof to a risk prediction. The machine learning models may be trained according to input-output pairs of webpages and human annotated risk levels for the webpages. In some embodiments, the machine learning model or models include a classifier that classifies the link as dangerous/risky or not according to a probability. However, in other embodiments, the machine learning model includes a regression model that predicts a risk score. In some embodiments, classifiers and regressors are used in conjunction. Once the machine learning model predicts a riskiness of the web site, the security system may compare the prediction to a threshold level of risk, e.g., an administrator defines threshold level of risk on a scale of, e.g., about 1 to about 10, about 1 to about 20, about 1 to about 100, or any other suitable scale. The security system may then determine whether to consider the link a risk or not a risk.

In some embodiments, link may be determined to, no, not be a risk. Thus, the direct routing of the link to the user device at which it was selected is initiated at block 404. Thus, the user device may interact with the link directly where the link has an address internal to the local network.

In some embodiments, the link may be determined that, yes, the link is a risk or dangerous. As a result of the link being classified as dangerous or risky, the security system may reroute the link to a secure sandbox, such as a virtual sandbox, by determining, at block 406, an existing set of sandboxes. In some embodiments, the security system may include a log of sandbox instances that records currently instantiated sandboxes as well as associated link information, such as a link addresses. Thus, sandboxes are maintained for each link selected by a user device on the local network and satisfying the risk threshold.

In some embodiments, the link and address of the link are compared to each sandbox instance in the log and the associated link information to determine, at block 407, whether a matching instance exists for the link address. In some embodiments, the matching may include comparing the address of the selected link to the address of a link associated with each instantiated sandbox.

In some embodiments, where an instantiated sandbox is not found that is associated with a matching address and/or link, a new sandbox may be instantiated at block 408. The new sandbox can be added to the log with the selected link and associated address. The selected link may then be routed through the new sandbox such that the new sandbox received data and/or code from the address to execute the link. For example, the new sandbox may open the webpage and run, e.g., Javascript™, Flash code, HTML, and any media and/or files present on the webpage. Thus, any malicious or harmful elements of the webpage affect only the new sandbox, which is isolated from physical systems on the local network by security policies. For example, the security policies may include restrictions on the ability of a user to navigate outside of the link address, restrictions on what hardware the webpage may access, restrictions on how long the webpage may run and how much data the webpage may transfer to the new sandbox, among other restrictions. However, to facilitate user interaction, a browser UI may be created at the user device to visually convey the link outputs, such as the webpage and any media, to a screen of the user device. Thus, the user may still interact with the webpage even though the webpage is being run remotely in the new sandbox.

In some embodiments, where an instantiated sandbox is found that is associated with a matching address and/or link, the link may be routed through the existing sandbox at block 409. The selected link and associated address can be added to the log with the existing sandbox. By routing the link through the existing sandbox, the existing sandbox receives data and/or code from the address to execute the link. For example, the new sandbox may open the webpage and run, e.g., Javascript™, Flash code, HTML, and any media and/or files present on the webpage. Thus, any malicious or harmful elements of the webpage affect only the existing sandbox, which is isolated from physical systems on the local network by security policies. For example, the security policies may include restrictions on the ability of a user to navigate outside of the link address, restrictions on what hardware the webpage may access, restrictions on how long the webpage may run and how much data the webpage may transfer to the existing sandbox, among other restrictions. However, to facilitate user interaction, a browser UI may be created at the user device to visually convey the link outputs, such as the webpage and any media, to a screen of the user device. Thus, the user may still interact with the webpage even though the webpage is being run remotely in the existing sandbox.

In some embodiments, the selected link may always be routed through a new sandbox specific to that selected link. However, by routing the link through a sandbox already associated with the link (e.g., the existing sandbox), multiple users may interact with a link in a common sandbox, which reduces resources. Moreover, routing the link through a common sandbox for multiple users may facilitate tracking link behaviors and collecting greater amounts of statistics and data associated with the link behaviors. Thus, in some embodiments, link analysis can be improved by using the existing sandbox, thus improving system and network security with greater knowledge of each link. The improved knowledge can be used to better identify dangerous and malicious links by, e.g., training machine learning models, such as those described above, whitelisting and blacklisting links by an administrator based on link behaviors, among other security improvements.

Figure 5:
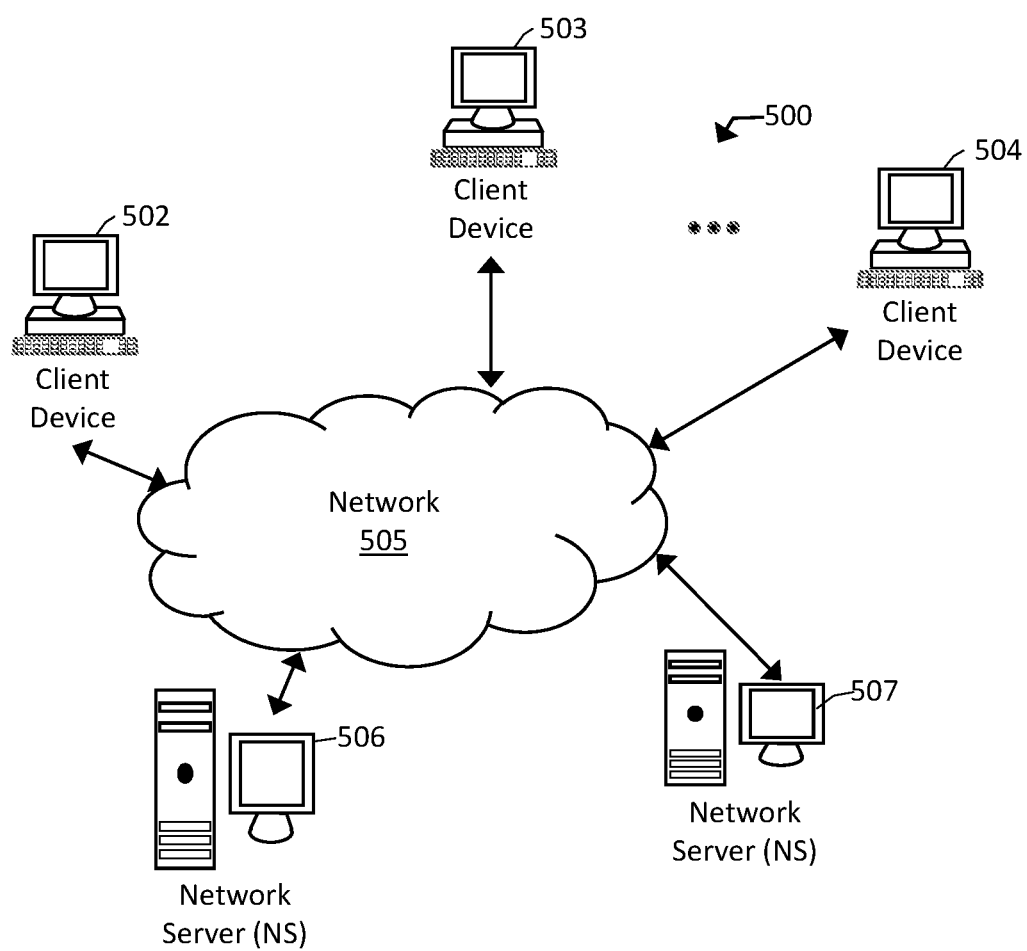

FIG. 5 depicts a block diagram of an exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 500 may be configured to manage a large number of members and/or concurrent transactions, as detailed herein. In some embodiments, the exemplary computer-based system/platform 500 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 5, members 502-504 (e.g., clients) of the exemplary computer-based system/platform 500 may include virtually any computing device capable of receiving and sending a message over a network (e.g., cloud network), such as network 505, to and from another computing device, such as servers 506 and 507, each other, and the like. In some embodiments, the member devices 502-504 may be personal computers, multiprocessor systems, microprocessor-based or programmable consumer electronics, network PCs, and the like. In some embodiments, one or more member devices within member devices 502-504 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 502-504 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 502-504 may include may run one or more applications, such as Internet browsers, mobile applications, voice calls, video games, videoconferencing, and email, among others. In some embodiments, one or more member devices within member devices 502-504 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 502-504 may be specifically programmed by either Java, .Net, QT, C, C++ and/or other suitable programming language. In some embodiments, one or more member devices within member devices 502-504 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 505 may provide network access, data transport and/or other services to any computing device coupled to it. In some embodiments, the exemplary network 505 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 505 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 505 may include and implement, as an alternative or in conjunction with one or more of the above, a WiMAX architecture defined by the WiMAX forum. In some embodiments and, optionally, in combination of any embodiment described above or below, the exemplary network 505 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 505 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 505 may also include mass storage, such as network attached storage (NAS), a storage area network (SAN), a content delivery network (CDN) or other forms of computer or machine readable media.

In some embodiments, the exemplary server 506 or the exemplary server 507 may be a web server (or a series of servers) running a network operating system, examples of which may include but are not limited to Microsoft Windows Server, Novell NetWare, or Linux. In some embodiments, the exemplary server 506 or the exemplary server 507 may be used for and/or provide cloud and/or network computing. Although not shown in FIG. 5, in some embodiments, the exemplary server 506 or the exemplary server 507 may have connections to external systems like email, SMS messaging, text messaging, ad content providers, etc. Any of the features of the exemplary server 506 may be also implemented in the exemplary server 507 and vice versa.

In some embodiments, one or more of the exemplary servers 506 and 507 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 501-504.

In some embodiments and, optionally, in combination of any embodiment described above or below, for example, one or more exemplary computing member devices 502-504, the exemplary server 506, and/or the exemplary server 507 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 6:
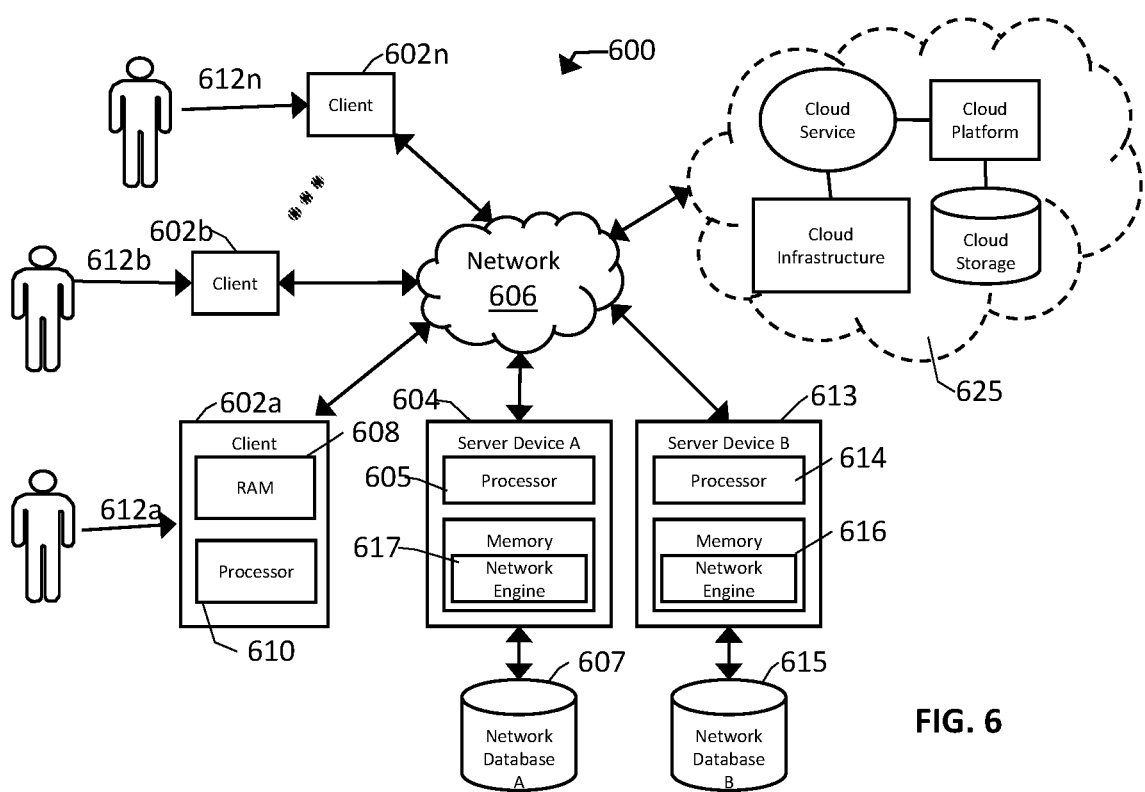

FIG. 6 depicts a block diagram of another exemplary computer-based system/platform 600 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 602a, 602b through 602n shown each at least includes a computer-readable medium, such as a random-access memory (RAM) 608 coupled to a processor 610 or FLASH memory. In some embodiments, the processor 610 may execute computer-executable program instructions stored in memory 608. In some embodiments, the processor 610 may include a microprocessor, an ASIC, and/or a state machine. In some embodiments, the processor 610 may include, or may be in communication with, media, for example computer-readable media, which stores instructions that, when executed by the processor 610, may cause the processor 610 to perform one or more steps described herein. In some embodiments, examples of computer-readable media may include, but are not limited to, an electronic, optical, magnetic, or other storage or transmission device capable of providing a processor, such as the processor 610 of client 602a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, etc.

In some embodiments, member computing devices 602a through 602n may also comprise a number of external or internal devices such as a mouse, a CD-ROM, DVD, a physical or virtual keyboard, a display, or other input or output devices. In some embodiments, examples of member computing devices 602a through 602n (e.g., clients) may be any type of processor-based platforms that are connected to a network 606 such as, without limitation, personal computers, digital assistants, personal digital assistants, smart phones, pagers, digital tablets, laptop computers, Internet appliances, and other processor-based devices. In some embodiments, member computing devices 602a through 602n may be specifically programmed with one or more application programs in accordance with one or more principles/methodologies detailed herein. In some embodiments, member computing devices 602a through 602n may operate on any operating system capable of supporting a browser or browser-enabled application, such as Microsoft™ Windows™, and/or Linux. In some embodiments, member computing devices 602a through 602n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 602a through 602n, users, 612a through 612n, may communicate over the exemplary network 606 with each other and/or with other systems and/or devices coupled to the network 606. As shown in FIG. 6, exemplary server devices 604 and 613 may be also coupled to the network 606. In some embodiments, one or more member computing devices 602a through 602n may be mobile clients.

In some embodiments, at least one database of exemplary databases 607 and 615 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 7:
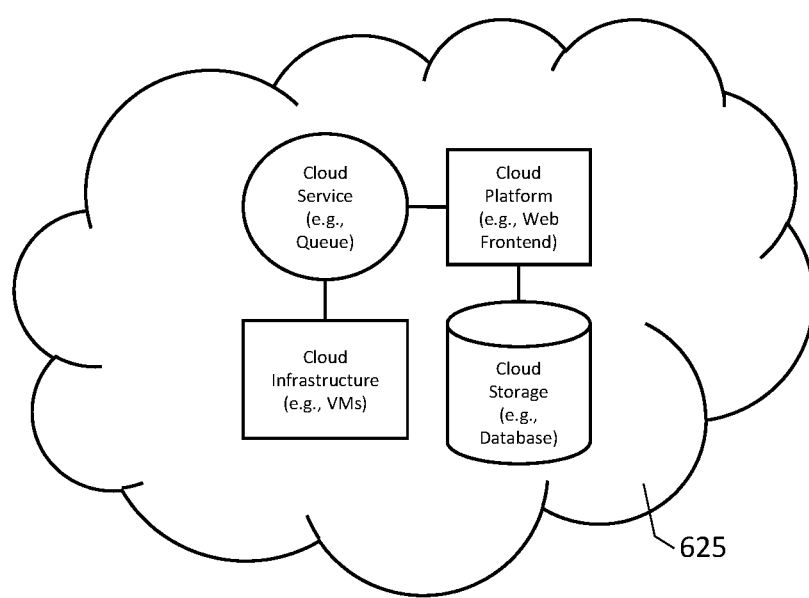
Figure 8:
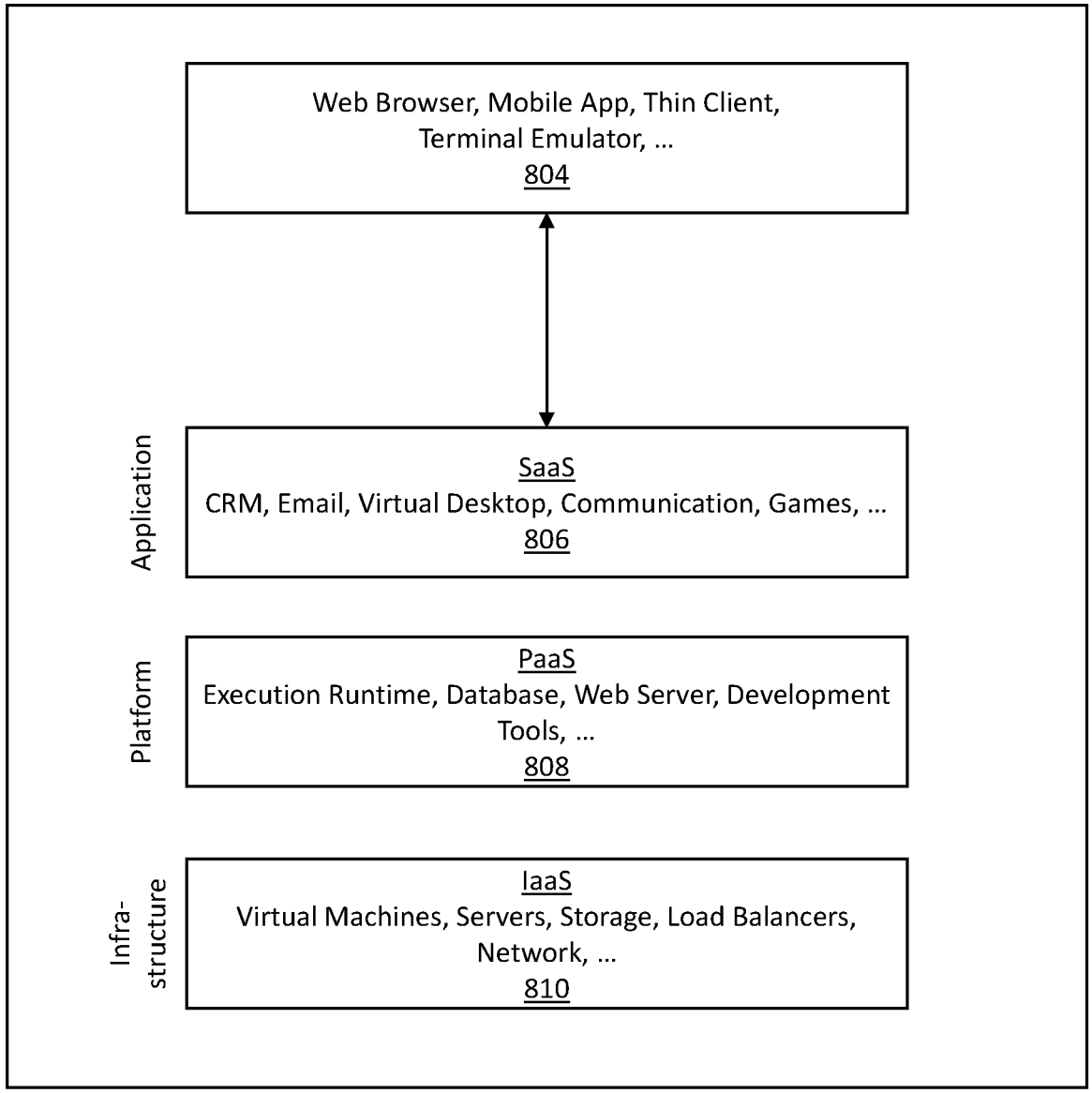

In some embodiments, the exemplary inventive computer-based systems of the present disclosure may be specifically configured to operate in a cloud computing/architecture such as, but not limiting to: infrastructure a service (IaaS), platform as a service (PaaS), and/or software as a service (SaaS). FIGS. 7 and 8 illustrate schematics of exemplary implementations of the cloud computing/architecture(s) in which the exemplary inventive computer-based systems of the present disclosure may be specifically configured to operate.

At least some aspects of the present disclosure will now be described with reference to the following numbered clauses.

1. A method, comprising:
   intercepting, by a processor associated with an entity, an internet request;
      wherein the internet request is produced by a link received in an email at a first computing device;
   determining, by the processor, that the link is externally bound relative to an entity network;
   determining, by the processor, an existence of a sandbox environment instance in a set of existing sandbox environment instances
      wherein the sandbox environment instance is associated with the link according to a sandbox log;
      wherein the sandbox log is stored on a database associated with the entity;
      wherein the sandbox environment instance comprises an environment for executing software with restricted access to at least one resource associated with the entity;
      wherein the sandbox environment instance is hosted at a second computing device associated with the entity;
      wherein the processor is remote from the first computing device;
      wherein each of the existing sandbox environment instances are associated with one or more additional computing devices;
      wherein each of the existing sandbox environment instances route a common link associated with the one or more additional computing devices;
   routing, by the processor, the link through the sandbox environment instance;
   updating, by the processor, the sandbox log in the database based on the sandbox environment instance and the link;
   causing, by the processor, to display on a screen of the first computing device a user interface for interacting with the link in the sandbox environment instance; and
   logging, by the processor, at least one activity associated with interacting with the link in a security log;
      wherein the security log is stored in the database associated with the entity.

2. The method of clause 1, further comprising:
   determining, by the processor, that the link is internally bound; and
   opening, by the processor, the link in a web browser.

3. The method of clause 1, further comprising:
   determining, by the processor, a risk level associated with the link;
      wherein the risk level comprises a predicted risk of malicious components;
   determining, by the processor, that the risk level is greater than a threshold risk level; and
   determining, by the processor, to route the link through the sandbox environment instance upon the risk level being greater than the threshold risk level.

4. The method of clause 1, further comprising:
   detecting, by the processor, a period of inactivity associated with the sandbox environment instance;
   determining, by the processor, that the period of inactivity is greater than a threshold period of inactivity; and
   causing, by the processor, the sandbox environment instance to shutdown upon the period of inactivity being greater than the threshold period of inactivity.

5. The method of clause 4, further comprising determining the threshold period of inactivity based on a suspected type of virus according to a risk level prediction.

6. The method of clause 1, wherein the behaviors comprise at least one statistic of a webpage associated with the link;
   wherein the at least one statistic comprise traffic on the webpage.

7. The method of clause 1, wherein the at least one activity comprises a website flowpath.

8. The method of clause 1, further comprising scanning a webpage associated with the link for malicious components based on previous behaviors in the security log.

9. The method of clause 1, further comprising instantiating a new instance of the sandbox environment instance upon a determination that the sandbox environment instance does not exist for the link according to the sandbox log.

10. The method of clause 1, further comprising:
   determining, by the processor, that one or more of the existing sandbox environment instances routes the link to at least one additional computing device;
   selecting, by the processor, the one or more of the existing sandbox environment instances as the sandbox environment instance to route the link for the first computing device; and
   updating, by the processor, the sandbox log to include an association between the first computing device and the one or more of the existing sandbox environment instance.

11. A method, comprising:
   receiving, by a processor of a user device associated with an entity network, a link in an email at a first computing device;
   determining, by the processor, that the link is externally bound relative to the entity network;
   requesting, by the processor, a sandbox environment instance associated with the link at an entity relative to the user device;
      wherein the sandbox environment instance comprises an environment for executing software with restricted access to at least one resource associated with the entity;
      wherein the request causes the entity to:
         determine an existence of the sandbox environment instance in a set of existing sandbox environment instances,
            wherein the sandbox environment instance is associated with the link according to a sandbox log, wherein the sandbox log is stored on a database associated with the entity, wherein the existing sandbox environment instances are associated with one or more additional computing devices, wherein each of the existing sandbox environment instances route a common link associated with the one or more additional computing devices, route the link through the sandbox environment instance, update the sandbox log in a database associated with the entity based on the sandbox environment instance and the link, communicate a user interface for interacting with the link to the user device, and log at least one activity associated with interacting with the link in a security log;

wherein the security log is stored in the database associated with the entity;

causing, by the processor, to display on a screen of the first computing device the user interface for interacting with the link in the sandbox environment instance.

12. The method of clause 11, further comprising:
determining, by the processor, that the link is internally bound; and
opening, by the processor, the link in a web browser.

13. The method of clause 11, further comprising:
determining, by the processor, a risk level associated with the link;
wherein the risk level comprises a predicted risk of malicious components;
determining, by the processor, that the risk level is greater than a threshold risk level; and
determining, by the processor, to route the link through the sandbox environment instance upon the risk level being greater than the threshold risk level.

14. The method of clause 11, wherein the request further causes the entity to:
detecting, by a host processor, a period of inactivity associated with the sandbox environment instance;
determining, by the host processor, that the period of inactivity is greater than a threshold period of inactivity; and
causing, by the host processor, the sandbox environment instance to shutdown upon the period of inactivity being greater than the threshold period of inactivity.

15. The method of clause 14, wherein the request further causes the entity to determine the threshold period of inactivity based on a suspected type of virus according to a risk level prediction.

16. The method of clause 11, wherein the behaviors comprise at least one statistic of a webpage associated with the link;
wherein the at least one statistic comprise traffic on the webpage.

17. The method of clause 11, wherein the at least one activity comprises a website flowpath.

18. The method of clause 11, further comprising instantiating a new instance of the sandbox environment instance upon a determination that the sandbox environment instance does not exist for the link according to the sandbox log.

19. The method of clause 11, further comprising:
determining, by the processor, that one or more of the existing sandbox environment instances routes the link to at least one additional computing device;
selecting, by the processor, the one or more of the existing sandbox environment instances as the sandbox environment instance to route the link for the first computing device; and updating, by the processor, the sandbox log to include an association between the first computing device and the one or more of the existing sandbox environment instance.

20. A system, comprising:
a database associated with an entity, configured to:
store a sandbox log for recording at least one sandbox environment instance and associated links; and
store a security log for logging at least one activity associated with interacting with the associated links;
a processor configured to:
intercept an internet request;
wherein the internet request is produced by a link received in an email associated with a first computing device;
determine that the link is externally bound relative to an entity network;
determine an existence of a sandbox environment instance of the at least one sandbox environment instance associated with the link according to the sandbox log;
wherein the sandbox environment instance comprises an environment for executing software with restricted access to resources;
wherein the sandbox environment instance is hosted with the processor associated with the entity;
wherein the processor is remote from the first computing device;
determine that an existing sandbox environment instance routes the link for at least one additional computing device;
select the existing sandbox environment instance as the sandbox environment instance;
route the link through the sandbox environment instance;
update the sandbox log in the database based on the sandbox environment instance and the link;
cause to display on a screen of the first computing device a user interface for interacting with the link in the sandbox environment instance; and
log at least one activity associated with interacting with the link in a security log.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:
1. A method, comprising:
receiving, by a processor of a computer environment, an electronic request comprising a link to an electronic network destination;
determining, by the processor, whether the link matches to a first link-specific sandbox environment instance from a set of link-specific sandbox environment instances, wherein each link-specific sandbox environment instance in the set of link-specific sandbox environment instances is associated with a unique link;
performing, by the processor, one of:
i) routing the link to the electronic network destination through the first sandbox environment instance, or ii) generating a second link-specific sandbox environment instance and routing the link to the electronic network destination through the second sandbox environment instance when the link to the electronic network destination does not match to any sandbox environment instance from the set of link-specific sandbox environment instances.

2. The method of claim 1, further comprising:
determining, by the processor, that the link is internally bound relative to a network of the first computing device; and
opening, by the processor, the link in a web browser.

3. The method of claim 1, further comprising:
determining, by the processor, a risk level associated with the link;
wherein the risk level comprises a predicted risk of malicious components;
determining, by the processor, that the risk level is greater than a threshold risk level; and
determining, by the processor, to route the link through the sandbox environment instance upon the risk level being greater than the threshold risk level.

4. The method of claim 1, wherein the request further causes the entity to:
detecting, by a host processor, a period of inactivity associated with the sandbox environment instance;
determining, by the host processor, that the period of inactivity is greater than a threshold period of inactivity; and
causing, by the host processor, the sandbox environment instance to shutdown upon the period of inactivity being greater than the threshold period of inactivity.

5. The method of claim 1, further comprising determining, by the at least one processor, the threshold period of inactivity based on a suspected type of virus according to a risk level prediction.

6. The method of claim 1, wherein the at least one activity associated with interacting with the link comprises at least one statistic of a webpage associated with the link associated with at least one statistic comprising traffic on the webpage.

7. The method of claim 1, wherein the at least one activity comprises a website flowpath.

8. The method of claim 1, further comprising instantiating a new instance of the sandbox environment instance upon a determination that the sandbox environment instance does not exist for the link according to the sandbox log.

9. The method of claim 1, further comprising:
determining, by the processor, that one or more of the existing sandbox environment instances routes the link to at least one additional computing device;
selecting, by the processor, the one or more of the existing sandbox environment instances as the sandbox environment instance to route the link for the first computing device; and
updating, by the processor, the sandbox log to include an association between the first computing device and the one or more of the existing sandbox environment instance.

10. The method of claim 1, further comprising generating, by the processor, a new sandbox environment instance comprising the sandbox environment instance where the sandbox environment instance is determined not to exist in the set of link-specific sandbox environment instances.

11. A system, comprising:
a processor of an internal computer environment, the processor configured to:
receive an electronic request comprising a link to an electronic destination;
determine whether the link matches to a first link-specific sandbox environment instance from a set of link-specific sandbox environment instances,
wherein each link-specific sandbox environment instance in the set of link-specific sandbox environment instances is associated with a unique link;
performing one of:
i) routing the link to the electronic network destination through the first sandbox environment instance, or
ii) generating a second link-specific sandbox environment instance and routing the link to the electronic network destination through the second sandbox environment instance when the link to the electronic network destination does not match to any sandbox environment instance from the set of link-specific sandbox environment instances.

* * * * *